US009066159B2

(12) United States Patent
Mak

(10) Patent No.: US 9,066,159 B2
(45) Date of Patent: Jun. 23, 2015

(54) USER CONTROL OF AD SELECTION FOR SUBSEQUENT AD BREAK OF A VIDEO

(71) Applicant: Hulu, LLC, Santa Monica, CA (US)

(72) Inventor: Wing Chit Mak, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 13/658,671

(22) Filed: Oct. 23, 2012

(65) Prior Publication Data

US 2014/0115631 A1    Apr. 24, 2014

(51) Int. Cl.
| H04N 21/845 | (2011.01) |
| H04N 21/234 | (2011.01) |
| H04N 21/433 | (2011.01) |
| H04N 21/262 | (2011.01) |
| H04N 21/258 | (2011.01) |
| H04N 21/2668 | (2011.01) |
| H04N 21/431 | (2011.01) |
| H04N 21/44 | (2011.01) |
| H04N 21/475 | (2011.01) |
| H04N 21/482 | (2011.01) |
| H04N 21/6543 | (2011.01) |
| H04N 21/6587 | (2011.01) |
| H04N 21/81 | (2011.01) |
| G06Q 30/02 | (2012.01) |
| H04H 20/10 | (2008.01) |
| H04H 20/38 | (2008.01) |
| H04H 20/82 | (2008.01) |
| H04L 29/06 | (2006.01) |

(52) U.S. Cl.
CPC ..... *H04N 21/8456* (2013.01); *H04N 21/23424* (2013.01); *H04N 21/4331* (2013.01); *H04N 21/26241* (2013.01); *H04N 21/25891* (2013.01); *H04N 21/2668* (2013.01); *H04N 21/4316* (2013.01); *H04N 21/44008* (2013.01); *H04N 21/4755* (2013.01); *H04N 21/4826* (2013.01); *H04N 21/6543* (2013.01); *H04N 21/6587* (2013.01); *H04N 21/812* (2013.01); *H04N 21/8173* (2013.01); *G06Q 30/02* (2013.01); *G06Q 30/0267* (2013.01); *G06Q 30/0257* (2013.01); *H04H 20/10* (2013.01); *H04H 20/38* (2013.01); *H04H 20/82* (2013.01); *H04L 65/4084* (2013.01); *H04L 65/602* (2013.01)

(58) Field of Classification Search
None
See application file for complete search history.

(56) References Cited

U.S. PATENT DOCUMENTS

| 6,760,746 | B1 | 7/2004 | Schneider |
| 7,197,758 | B1 | 3/2007 | Blackketter et al. |
| 7,415,537 | B1 | 8/2008 | Maes |
| 7,665,107 | B2 | 2/2010 | Goodman et al. |
| 7,801,054 | B2 | 9/2010 | Reichman et al. |

(Continued)

OTHER PUBLICATIONS

International Search Report mailed Apr. 1, 2013 from International Patent Application No. PCT/US2012/058502 filed Oct. 2, 2012.

(Continued)

*Primary Examiner* — Justin Shepard
(74) *Attorney, Agent, or Firm* — Fountainhead Law Group PC

(57) ABSTRACT

During or prior to streaming of video content to a client device, a server provides data configuring an interactive object on the client device. When activated by user input, the interactive object enables a user to select one or more video ads to be streamed to the client device during an upcoming ad break, during play of the streaming video. The interactive object enables the user to perform the selection without interrupting viewing of the video.

34 Claims, 12 Drawing Sheets

(56) References Cited

U.S. PATENT DOCUMENTS

| | | |
|---|---|---|
| 7,945,926 B2 * | 5/2011 | Dempski et al. ............... 725/34 |
| 8,359,612 B2 * | 1/2013 | Barton ........................... 725/32 |
| 8,516,518 B2 | 8/2013 | Bolyukh et al. |
| 2002/0129362 A1 | 9/2002 | Chang et al. |
| 2002/0138831 A1 | 9/2002 | Wachtfogel et al. |
| 2002/0194593 A1 | 12/2002 | Tsuchida et al. |
| 2003/0101454 A1 * | 5/2003 | Ozer et al. ..................... 725/42 |
| 2003/0105678 A1 | 6/2003 | Bratton |
| 2003/0126598 A1 | 7/2003 | Agnihotri et al. |
| 2003/0149975 A1 | 8/2003 | Eldering et al. |
| 2003/0167202 A1 | 9/2003 | Marks et al. |
| 2004/0019905 A1 | 1/2004 | Fellenstein et al. |
| 2004/0054577 A1 | 3/2004 | Inoue et al. |
| 2004/0158852 A1 | 8/2004 | Wysocki |
| 2005/0060745 A1 | 3/2005 | Riedl et al. |
| 2006/0168616 A1 | 7/2006 | Candelore |
| 2007/0220552 A1 | 9/2007 | Juster et al. |
| 2008/0040741 A1 | 2/2008 | Matsumoto |
| 2008/0059312 A1 | 3/2008 | Gern et al. |
| 2008/0059997 A1 | 3/2008 | Plotnick et al. |
| 2008/0066107 A1 | 3/2008 | Moonka et al. |
| 2008/0115161 A1 | 5/2008 | Kurzion |
| 2008/0127246 A1 | 5/2008 | Sylvain |
| 2008/0137541 A1 | 6/2008 | Agarwal et al. |
| 2008/0229353 A1 * | 9/2008 | Morris et al. .................. 725/32 |
| 2008/0229371 A1 | 9/2008 | Mick et al. |
| 2008/0284911 A1 | 11/2008 | Lemmers et al. |
| 2008/0307454 A1 | 12/2008 | Ahanger et al. |
| 2009/0012867 A1 | 1/2009 | Lerman et al. |
| 2009/0013347 A1 | 1/2009 | Ahanger et al. |
| 2009/0094634 A1 | 4/2009 | Haberman et al. |
| 2009/0228920 A1 * | 9/2009 | Tom et al. ...................... 725/35 |
| 2009/0282098 A1 | 11/2009 | Karaoguz et al. |
| 2010/0077095 A1 | 3/2010 | Wong et al. |
| 2010/0198697 A1 | 8/2010 | Brown et al. |
| 2010/0251288 A1 | 9/2010 | Carlucci et al. |
| 2012/0110615 A1 | 5/2012 | Kilar et al. |
| 2012/0110618 A1 | 5/2012 | Kilar et al. |
| 2013/0086607 A1 | 4/2013 | Tom et al. |

OTHER PUBLICATIONS

Saito et al., "Implementation of an Internet Broadcasting System with Video Advertisement Insertion based on Audience Comments," 2010 International Conference on P2P, Parallel, Grid, Cloud and Internet Computing, 2010, pp. 505-510.

Chen et al., "Automatic Insertion of Advertisements into a Video Sequence," Proceeding of the Ninth International Conference on Machine Learning and Cybernetics, Qingdao, Jul. 11-14, 2010, pp. 2121-2126.

Covell et al., "Detecting Ads in Video Streams Using Acoustic and Visual Cues," IEEE Invisible Computing, Dec. 2006, pp. 135-137.

International Search Report from International Application No. PCT/US2011/053480 mailed Feb. 16, 2012.

International Search Report from International Application No. PCT/US2011/053506 mailed Feb. 22, 2012.

* cited by examiner

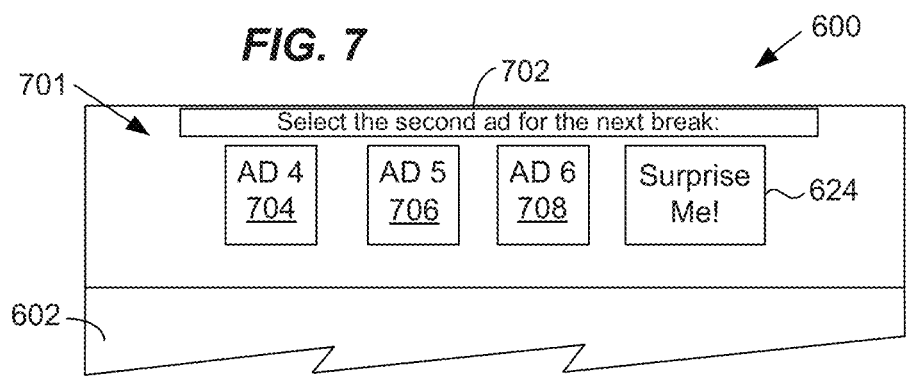
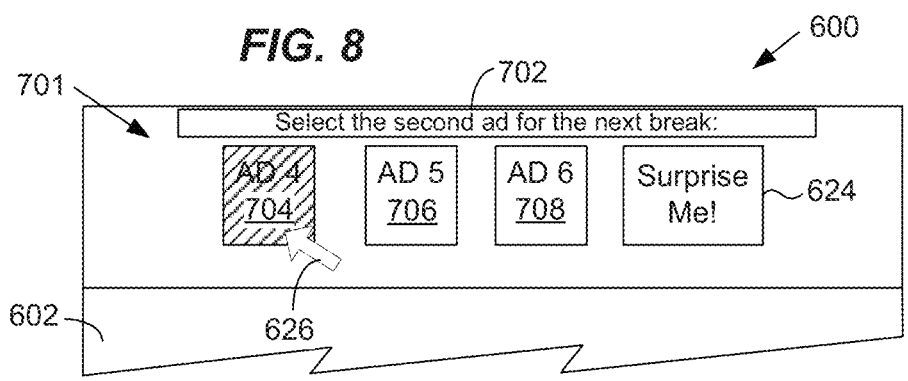

1010: CONFIGURING AN INTERACTIVE OBJECT FOR OPERATING ON THE CLIENT DEVICE DURING THE STREAMING VIDEO TO PROCESS THE INDICATION BASED ON USER INPUT

1020: SERVING THE INTERACTIVE OBJECT TO THE CLIENT DEVICE DURING THE STREAMING

1030: SERVING THE INTERACTIVE OBJECT TO THE CLIENT DEVICE PRIOR TO THE STREAMING, CONFIGURED TO BE ACTIVATED AFTER THE STREAMING IS INITIATED

1040: CONFIGURING THE INTERACTIVE OBJECT TO APPEAR AS A SELECTABLE OBJECT NEAR A WINDOW IN WHICH THE VIDEO CONTENT IS BEING DISPLAYED ON THE CLIENT DEVICE

1050: CONFIGURING THE INTERACTIVE OBJECT TO APPEAR AS A SELECTABLE OBJECT OVERLYING THE VIDEO CONTENT ON THE CLIENT DEVICE

USER CONTROL OF AD SELECTION FOR SUBSEQUENT AD BREAK OF A VIDEO

FIELD

The present application relates generally to input/output processing using a computer, and more particularly to user control of ad selection for a subsequent ad break of a streaming video.

BACKGROUND

Advertising-supported distribution of audio-video data may be implemented from a content server to remote client devices over computer networks, telecommunications networks, and combinations of such networks, using various methods, for example progressive downloading or streaming. Platforms for such distribution may include sites that offer a great variety of different programming, including both newly released episodes of serial programs, major features, documentaries, special events, archives of past episodes and classic serial programs, of different types targeted to users having various different demographic profiles or located in different area, and in various formats for use on different kinds of player devices. One or more video ads may be inserted into each video program and sold to advertisers who are charged based on how many times each advertisement is played on a client device; i.e., for each video ad impression.

The delivery of video content by streaming or progressive download may be accomplished under a variety of models. In one model, the user pays for the viewing of each video program, for example, using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad pods" or "ad breaks." With streaming video, the media player may be configured so that the client device cannot play the video without also playing predetermined advertisements during the designated ad breaks. While this feature is helpful for ensuring that ad impressions are delivered to the client device, a lack of ability for the user to influence or control the advertising content played during the ad breaks may reduce the interest of some viewers in viewing streaming video content with inserted advertising. These and other limitations of prior methods for ad selection for a streaming video may be overcome by the novel methods and apparatus disclosed herein.

SUMMARY

Methods, apparatus and systems user control of ad selection for a subsequent ad break of a streaming video are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for user control of ad selection for a subsequent ad break of a streaming video may include streaming video content having a defined video ad break at a designated location from a computer server, wherein the defined video ad break is configured for a first non-zero number of video ads. The method may further include providing an identifier for each video ad included in a second number of video ads to a client device that is receiving the video content, prior to the defined video ad break, wherein the second number is greater than the first number. The method may further include receiving, during the streaming and prior to the defined video ad break, an indication of at least one selected video ad selected in response to user input from the second number of video ads. The method may include streaming the at least one selected video ad to the client device during the defined video ad break.

In an aspect, the method may include configuring an interactive object for operating on the client device during the streaming video to process the indication based on user input. In addition, the method may include serving the interactive object to the client device during the streaming. In an aspect, the method may include serving the interactive object to the client device prior to the streaming, configured to be activated after the streaming is initiated. In another aspect, the method may include configuring the interactive object to appear as a selectable object near a window in which the video content is being displayed on the client device. In the alternative, or in addition, the method may include configuring the interactive object to appear as a selectable object overlying the video content on the client device.

In other aspects, the method may include selecting, prior to the defined video ad break, the second number of video ads for play in the defined video ad break. The selecting the second number of video ads may further include eliminating one or more video ads played during a prior ad break of the streaming video. In the alternative, or in addition, the selecting the second number of video ads may further include selecting based on user profile information from the client device. In addition, the method may include storing the indication of at least one selected video ad in a computer memory; and selecting one or more alternative video ads presented for user selection after the defined ad break and prior to a following ad break, based on the indication.

Complementary operations, features, and aspects may also be implemented at a client device in communication with the computer server. Methods and apparatus for implementing user selection of advertising for a next ad break in a video streaming system at a client device are described in the detailed description below.

In related aspects, a client-side or server-side computing apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as computer servers, personal computers, network-enabled televisions, set-top boxes, smart phones, notepad or palm computers, laptop computers, and other computing devices of various types used for providing or accessing information over a computer network. Similarly, an article of manufacture may be provided, including a non-transitory computer-readable medium holding encoded instructions, which when executed by a processor, may cause a client-side or server-side computing apparatus to perform the methods and aspects of the methods as summarized above.

Further embodiments, aspects and details of methods, apparatus and systems for user control of ad selection for a subsequent ad break of a streaming video are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology. Like element numerals may be used to indicate like elements appearing in one or more of the figures.

FIGS. 7-8 illustrate screenshots of the next ad selector interface inviting user selection of advertising in a streaming video segment, at different times subsequent to times shown in FIGS. 6A-B.

FIGS. 9-11B are diagrams illustrating operations that may be performed by a network node in connection with user control of ad selection for a subsequent ad break of a streaming video.

DETAILED DESCRIPTION

Figure 1:
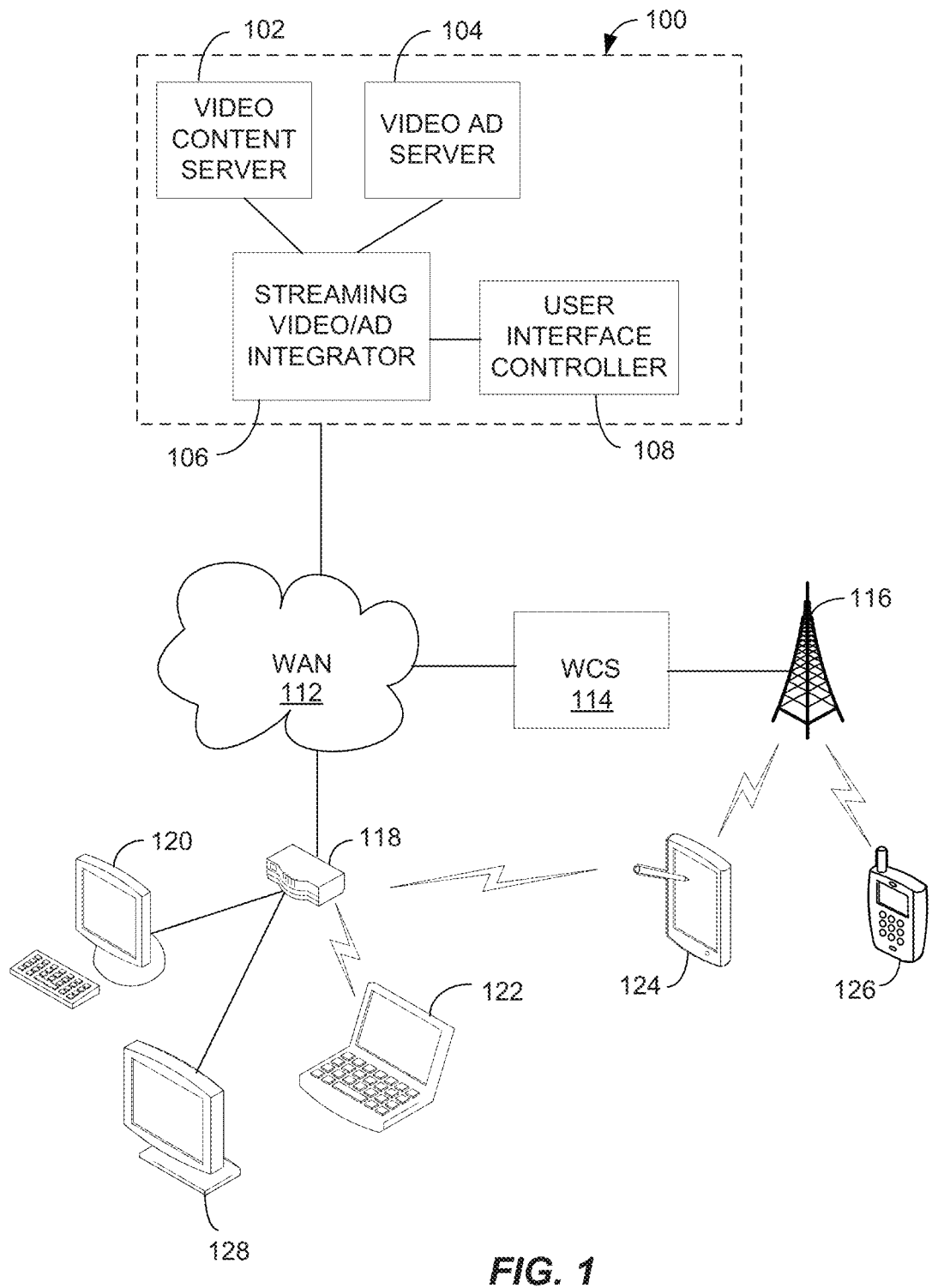
FIG. 1 is a schematic diagram illustrating an embodiment of a computing environment in which systems and methods discussed herein may be implemented.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

Features and aspects as disclosed herein may be implemented within a system including a video streaming system 100 in communication with multiple client devices via one or more communication networks. In streaming, a server streams audio-video data continuously to a media player component operating at least partly on the client device, which may play the audio-video data concurrently with receiving the streaming data from the server. The media player component may initiate play of the video data immediately after receiving an initial portion of the data from the content provider. Traditional streaming techniques use a single provider delivering a stream of data to a set of end users. Unlike progressive downloading, streaming media can be delivered on-demand or live. Progressive downloading may require downloading the entire file or downloading enough of the entire file to start playback at the beginning. In contrast, streaming may enable immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server 100 may be defined as a specialized device that accepts requests for video files, and based on information about the format, bandwidth and structure of those files, serves an amount of data necessary to play the video, at the rate needed to play it. Streaming media servers may also account for the transmission bandwidth and capabilities of the media player on the destination client. Unlike the web server, the streaming media server communicates with the client device using control messages and data messages to adjust to changing network conditions as the video is played. These control messages may include commands for enabling control functions such as fast forward, fast reverse, pausing, or seeking to a particular part of the file at the client. Since a streaming media server may transmit video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allows monitoring of who is viewing what video programs and how long they are watched (3) use transmission bandwidth more efficiently, since only the amount of data required to support the viewing experience is transmitted, and (4) the video file is not store in the viewer's computer, but discarded by the media player, thus allowing more control over the content.

Streaming media servers may use HTTP and TCP to deliver video streams, but generally use RTSP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user device at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program. Streaming media players at the client do not rely on buffering to provide random access to any point in the media program. Instead, this is accomplished through the use of control messages transmitted from the media player to the streaming media server.

The delivery of video content by streaming or progressive download may be accomplished under a variety of models. In one model, the user pays for the viewing of each video program, for example, using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad breaks." An ad break reserved for one or more video ads to be played in uninterrupted sequence may also be referred to as an "ad pod." With streaming video, the media player may be configured so that the client device cannot play the video without also playing predetermined advertisements during the designated ad breaks.

The video streaming system 100 may include one or more computer servers or modules 102, 104, 106, and/or 108 distributed over one or more computers. Each server 102, 104, 106, and/or 108 may include, or may be operatively coupled to, one or more data stores, for example databases, indexes, files, or other data structures (not shown). A video content server 102 may access a data store of various video segments; for example, television episodes, motion pictures, and other content produced as primary content of interest to consumers. The video content server 102 may serve the video segments as directed by a user interface controller module 108.

A video advertising server 104 may access a data store of relatively short video segments (e.g., 10 second, 30 second, or 60 second segments) configured as advertising for a particular advertiser or message. The advertising may be provided for an advertiser in exchange for payment of same kind, or may comprise a promotional message for the system 100, a public service message, or some other information. The ad server 104 may serve the video advertising segments as directed by the user interface controller 108. According to the novel operations described herein, the ad server may select alternative advertisements for a next ad break while the system 100 is streaming content from the video content server 104 to a client device (e.g., any one of the clients 118, 120, 122, 124, 126 or 128). The user interface controller may provide information identifying the selected alternative ads (e.g., a thumbnail graphic and/or text description or title) to the client device with the streaming content. The client device may receive both the streaming content and the alternative ad information, and display the alternative ad information prior to the next ad break using an interactive object or interface for receiving user selection input. The client device may receive user input selecting one of the alternative ads while playing the video content, prior to the next ad break; or may not receive user selection input during this time.

If the client device receives user selection input, it transmits information identifying the selected ad or ads to the user interface controller 108 and/or to the video ad server 104. In response to the information, the system 100 causes the selected ad or ads to be provided from the ad server 104 to the integrator component 106, which may stream the selected ads to the client that provided the selection data for output by the client during the next ad break. If the client device does not receive any user selection input in advance of the ad break, it may not take any responsive action. In that case, the system 100 may determine that no ad has been selected by the user, and automatically select one or more ads for streaming during the ad break, which may then be streamed to the client for output during the next ad break. In the alternative, the system 100 may determine based on information from the client that at least one ad has been selected by the client, but not enough ads have been selected to fill the next ad break. It may then automatically select enough additional ads to fill the next ad break, and transmit both the at least one user-selected ad and the one ore more additional system-selected ads to the client for output during the next ad break.

The ad server 104 may use any suitable method for determining the alternative ads for presentation prior to the next ad break or the system-selected (e.g., default) ads. For example, the system may select ads based on advertiser-requested parameters for controlling the distribution and targeting of video advertising, such as, for example, time, geographic, program type, and/or demographic control parameters. The system 100 is not limited to a particular method or system for selecting alternative ads for user selection, or default ads.

The video streaming system 100 may further include an integrator component 106 that integrates video content and video advertising into a streaming video segment as directed by the controller 108. The controller 108 may determine the selection or configuration of advertising in the streaming video, based on user input from a client device selecting, or declining to select, alternative advertising during periods prior to next ad breaks. The integrator 106 may integrate a system-selected default and/or user-selected ones of the alternative video advertisements into streaming content, based on one or more signals from a streaming client. The video streaming system 100 may include other modules or units not depicted in FIG. 1, for example administrative servers, commerce servers, network infrastructure, advertising selection engines, and so forth.

The video streaming system 100 may connect to a data communication network 112. A data communication network 112 may comprise a local area network (LAN), a wide area network (WAN), for example, the Internet, a telephone network, a wireless cellular telecommunications network 114, or some combination of these or similar networks.

One or more client devices may be in communication with the video streaming system 100, via the data communication network 112 and/or other network 114. Such client devices may include, for example, one or more laptop computers 122, desktop computers 120, "smart" mobile phones 126, notepad devices 124, network-enabled televisions 128, or combinations thereof, via a router 118 for a LAN, via a base station 116 for a wireless telephony network 114, or via some other connection. In operation, such client devices 120, 122, 124, 126, 128 may send and receive data or instructions to the system 100, in response to user input received from user input devices or other input. In response, the system 100 may serve video segments, video ads and related information to the client devices 120, 122, 124, 126, 128 and configure video segments with advertising based on user input to a next ad break ad selection process. The devices 120, 122, 124, 126, 128 may output video and related content from the streaming video segment using a display screen, projector, or other video output device. In certain embodiments, the system 100 configured in accordance with the features and aspects disclosed herein may be configured to operate within or support a cloud computing environment. For example, a portion of, or all of, the servers 102, 104 or 108 may reside in a cloud server.

Figure 2:
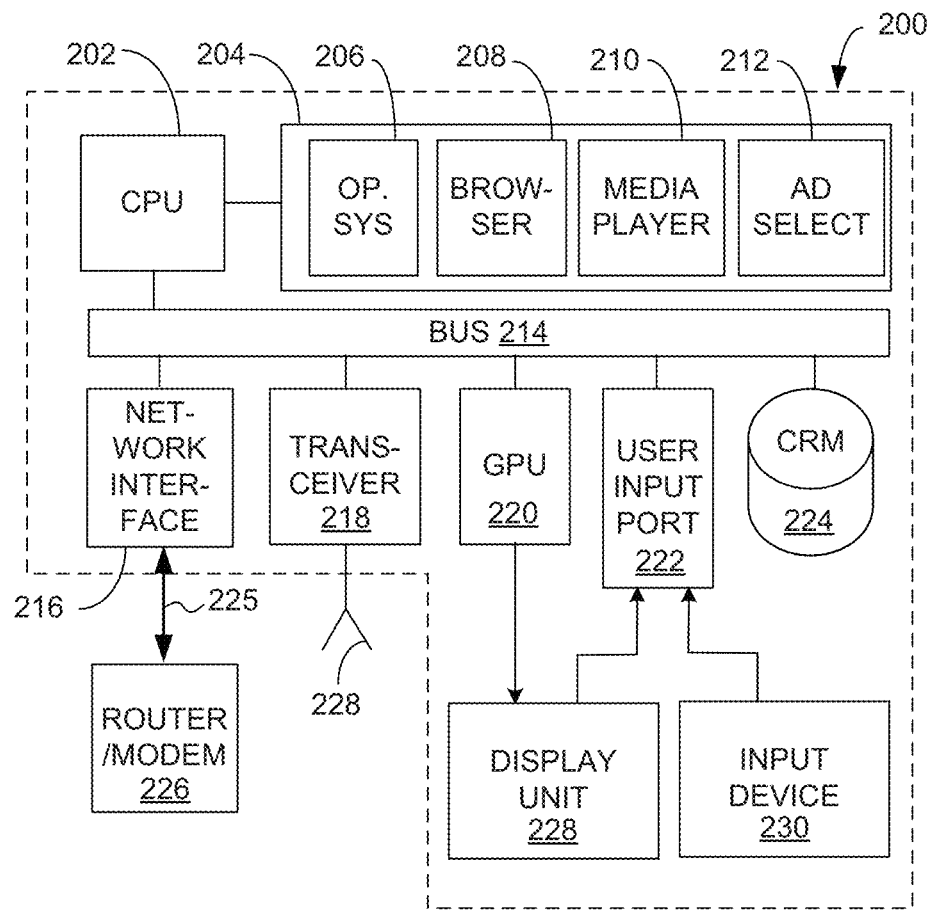
FIG. 2 is a schematic block diagram illustrating an embodiment of a client device for supporting and executing the systems and methods described herein.

Referring to FIG. 2, a diagrammatic view of an example client device 200 is illustrated. The client device 200 may be, or may include, a computer. One or more of the client devices 120, 122, 124, 126, 128 shown in FIG. 1 may be configured as, or may include, a computer or device configured as the device 200. In selected embodiments, the computer 200 may include a processor 202 operatively coupled to a processor memory 204, which holds binary-coded functional modules for execution by the processor 202. Such functional modules may include an operating system 206 for handling system functions such as input/output and memory access, a browser 208 for accessing information via the World Wide Web or similar network infrastructure, a media player 210 for playing streaming video and communicating with a streaming video system, and an interactive ad selection module 212 for handling user input and system data used for next ad break ad selection. The ad selection module 212 may be integrated into the media player 210, and may facilitate functions of a user interface for soliciting and receiving user input data to be used in a next ad break ad selection process, and communicating with a video streaming server to implement functions of the process. In the alternative, or in addition, some portion or all of the next ad break ad selection process functions may be implemented using the module 212 existing as an application or component separate from the media player 210.

A bus 214 or other communication component may support communication of information within the computer 200. The processor 202 may be a specialized or dedicated microprocessor configured to perform particular tasks in accordance with the features and aspects disclosed herein by executing machine-readable software code defining the particular tasks. Processor memory 204 (e.g., random access memory (RAM) or other dynamic storage device) may be connected to the bus 214 or directly to the processor 202, and store information and instructions to be executed by a processor 202. The memory 204 may also store temporary variables or other intermediate information during execution of such instructions.

A computer-readable medium in a storage device 224 may be connected to the bus 214 and store static information and instructions for the processor 202; for example, the storage device 224 may store the modules 206, 208, 210 and 212 when the client device 200 is powered off, from which the modules may be loaded into the processor memory 204 when the client 200 is powered up. The storage device 224 may include a non-transitory computer-readable medium holding information, instructions, or some combination thereof, for example instructions that when executed by the processor 202, cause the client device 200 to perform one or more operations of a method as described herein.

A communication interface 216 may also be connected to the bus 214. The communication interface 216 may provide or support two-way data communication between the client device 200 and one or more external devices, e.g., the streaming system 100, optionally via a router/modem 226 and a wired or wireless connection 225. In the alternative, or in addition, the client device 200 may include a transceiver 218 connected to an antenna 228, through which the client 200 may communicate wirelessly with a base station for a wireless communication system or with the router/modem 226.

The client device 200 may be connected (e.g., via the bus 214 and graphics processing unit 220) to a display unit 228. A display 228 may include any suitable configuration for displaying information to a user of the client device 200. For example, a display 228 may include or utilize a liquid crystal display (LCD), touchscreen LCD (e.g., capacitive display), light emitting diode (LED) display, projector, cathode ray tube (CRT), or other display device to present information to a user of the client device 200 in a visual display.

One or more input devices 230 (e.g., an alphanumeric keyboard, microphone, keypad, remote controller, game controller, camera or camera array) may be connected to the bus 214 via a user input port 222 to communicate information and commands to the client 200. In selected embodiments, an input device 230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 228, for example using a touch sensitive screen. A cursor control device may communicate direction information and command selections to the processor 202 and control cursor movement on the display 228. A cursor control device may have two or more degrees of freedom, for example allowing the device to specify cursor positions in a plane or three-dimensional space. In the alternative, the client may operate a user interface that does not require a cursor, for example a touch screen enabled interface wherein user selection of objects on the screen is performed by sensing the locations and/or movements of physical touches on the touch screen.

The client device 200 may be used to transmit, receive, and display one or more streaming video segments. In selected embodiments, such transmitting, receiving, and displaying may be in response to the processor 202 executing one or more sequences of one or more instructions contained in main memory 204. Such instructions may be read into main memory 204 from another non-transitory computer-readable medium (e.g., a storage device 224).

Execution of sequences of instructions contained in main memory 204 may cause a processor 202 to perform one or more of the procedures or steps described herein. In selected embodiments, one or more processors 202 in a multi-processing arrangement may also be employed to execute sequences of instructions contained in main memory 204. Alternatively, or in addition thereto, firmware may be used in place of, or in combination with, software instructions to implement procedures or steps in accordance with the features and aspects disclosed herein. Thus, embodiments in accordance with the features and aspects disclosed herein may not be limited to any specific combination of hardware circuitry and software.

The term "non-transitory computer-readable medium" as used herein may refer to any medium that participates in holding instructions for execution by a processor 202, or that stores data for processing by a computer. Such a medium may take many forms, including but not limited to, non-volatile media, volatile media, and temporary storage media (e.g., cache memory). Non-volatile media may include optical or magnetic disks, such as a storage device 224. Volatile media may include dynamic memory, such as main memory 204. Common forms of non-transitory computer-readable media may include, for example, a hard (magnetic media) disk, magnetic tape, or any other magnetic medium, a CD-ROM, DVD, Blu-ray or other optical disc or medium, RAM, PROM, EPROM, FLASH-EPROM, any other memory card, chip, or cartridge, or any other memory medium from which a computer can read.

Figure 3:
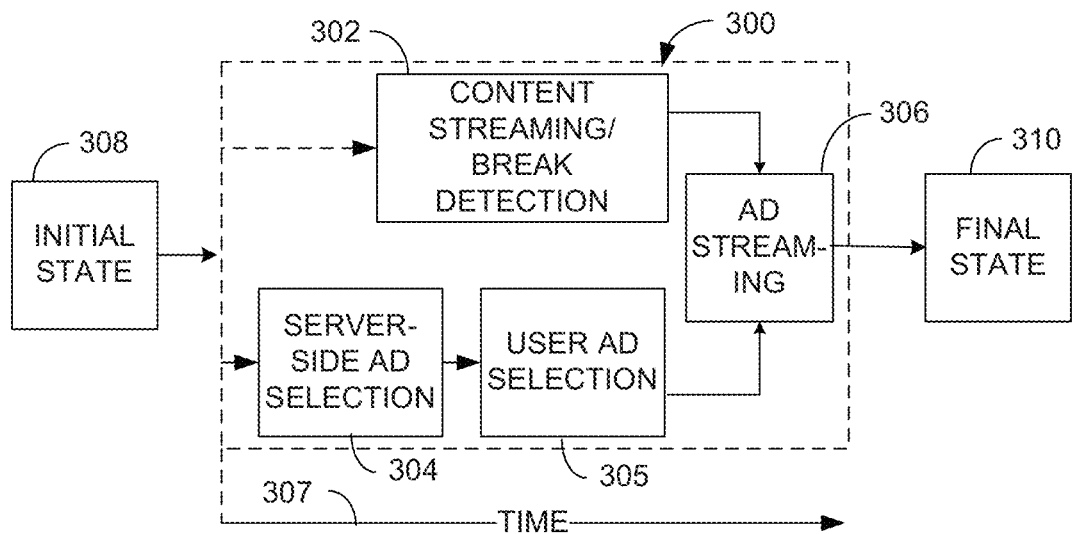
FIG. 3 is a state diagram illustrating general aspects of an interactive ad selection process as used for configuring a subsequent ad break in a streaming video segment.

Referring to FIG. 3, general aspects of a next ad break ad selection process 300 used for selection of advertising in a streaming video segment are illustrated as a state diagram. The initial state 308 represents a set of system-selected alternative advertisements for at least one corresponding break of a selected streaming video segment. The initial state 308 may be represented in a computer memory in various ways, for example by a list of advertising identifiers each identifying a specific video ad, and optionally one or more variables representing a number, duration and placement of ad breaks, associated with an identifier for a streaming video segment and/or an identifier for a streaming video session with a particular client device. In an alternative embodiment, one or more of the number, duration and placement of ad breaks may be determined by default based on an attribute of the video segment, such as run length. It should be apparent that the initial state 308 may be defined by data that represents, among other things, potential advertisements to be displayed during a video segment. As such, initial state data represents a bounded set of physical states of a video output device, one of which may be realized at a later time when the video segment is played on a client device.

The next ad break ad selection process 300 is (or includes) an input-output computation process performed by a computer processor over a time period indicated by the time line 307. The process 300 operates on the initial state 308 to output a final state 310. The final state 310 represents a defined selection of advertisements and corresponding breaks of a selected streaming video segment, generally without an excess number of advertisements, because once the final state is achieved any unused alternative ads are discarded. The next ad break ad selection process 300 may therefore operate as a state machine that accepts the initial state 308 and user input via an input device as inputs, and transforms the state data representing a many possible physical states of a video output device into a definite final state 310. Subsequently, the final output state is realized in physical output from a client device. The final output state may define a specific physical output, for example a display of a streaming video segment that is configured based on a selected one of the final output states.

The next ad break ad selection process 300 may include several interactive modules arranged in a specific time sequence. The modules may include, for example, a content streaming module 302, which may include or be associated with an ad break detection function. The modules may further include a server-side alternative ad selection module 304, which may initiate operation during the content streaming module 302 prior to a next ad break for which the module 304 selects alternative ads. The modules may further include user ad selection module 305, which may receive user selection input of ads for the next ad break. The modules may further include a streaming module 306 that determines the final state 310 based on input from the server-side alternative ad selection module 302 and the user ad selection module 305. When the module 302 determines an ad break is imminent, the streaming module may begin streaming a user-selected ad (or system-selected ad, if the user declines to make an ad selection) to a client device for output to a user.

Figure 4:
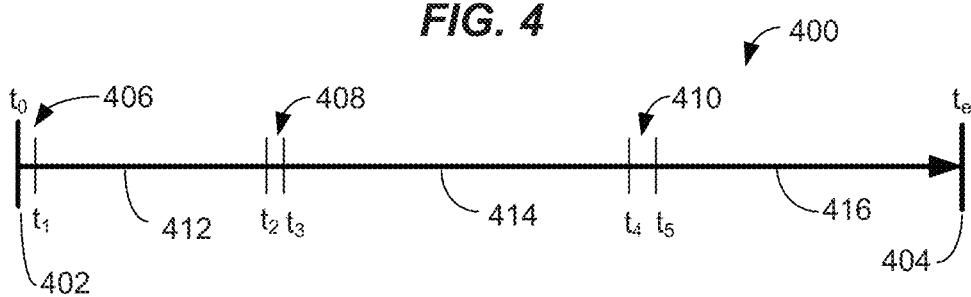
FIG. 4 is a line diagram illustrating aspects of a video segment including ad breaks.

FIG. 4 is a line diagram illustrating aspects of a video segment timeline 400 including ad breaks 406, 408 and 410. A video segment includes video data characterized by a sequence of video frames that are output in order at a defined frame rate to generate video output. At such, a video segment includes an initial or first frame at inception time "$t_0$" 402 of video output, and each subsequent frame is output at a defined time "t" after inception until a terminal or end time "$t_e$" 404. Thus, each frame defines a particular time or in the streaming video segment, typically measured from the time of inception. For example, for a video configured for 30 frames per second, the $300^{th}$ frame defines a time 10 seconds after inception. A time in a streaming video segment may sometime be referred to herein as a "location" in relation to a progress bar, time line or other time indicator.

Any non-negative, integral number of ad breaks 406, 408 and 410 may be configured in the video time line. Each ad break may be defined by a location and duration. For example, the first ad break 406 is located at "$t_0$" and has a duration of "$t_1-t_0$"; the second ad break 408 is located at "$t_2$" and has a duration of "$t_3-t_2$"; and the third ad break 410 is located at "$t_4$" and has a duration of "$t_5-t_4$". The inter-break portions 412, 414 and 416 are used for playing requested primary video content, and the ad breaks are used for playing video advertisements. In video streaming embodiments, a streaming media player operating on the client device may cause the video content to play in the defined inter-break portions 412, 414, 416 and receive streaming advertising videos of appropriate duration for playing in all of the ad breaks 406, 408, 410. The duration of the ad breaks may be predetermined, or may be determined on an ad hoc basis based on the duration of respective video ads streamed to the media player for playing in respective ones of the ad breaks.

User selection of alternative ads for next ad breaks may be configured to operate during the inter-break portions 412, 414 and 416. For example, the system may select alternative ads for the second ad break 408 during the inter-break portion 412, and provide information identifying the alternative ads to the client early in the portion 412. The client may display a user-selection interface during a remaining part of the inter-break portion 412, and provide an indication of any user-selected ads for the ad break 408 to the server after the time $t_1$ and prior to the time $t_2$.

Figure 5:
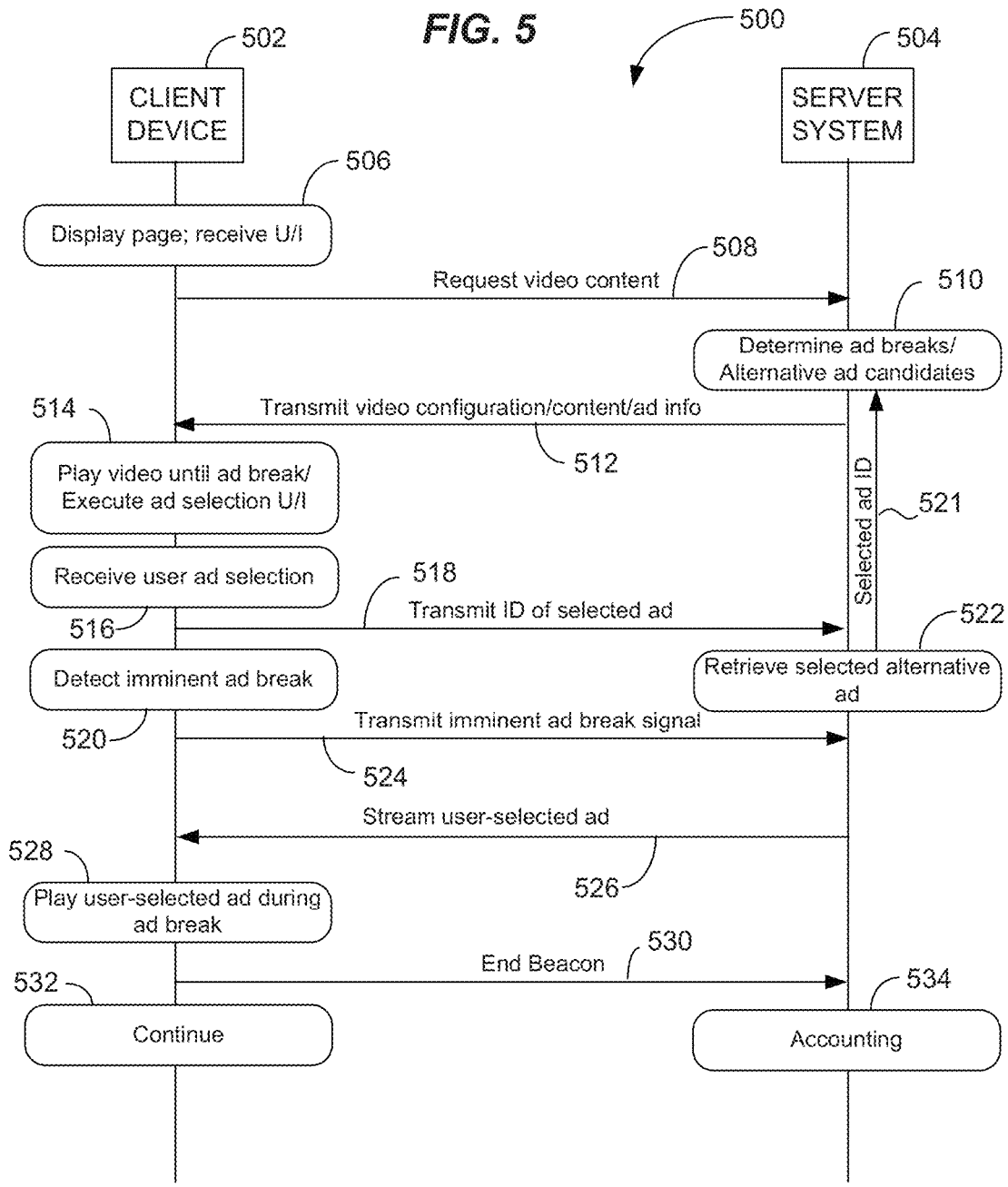
FIG. 5 is a sequence diagram illustrating an example of a call flow between a server system and a client device implementing user control of ad selection for a subsequent ad break of a streaming video.

FIG. 5 illustrates an example of a call flow 500 between a server system 504 and a client device 502 for implementing user controlled selection of video advertising in a streaming video in advance of each next ad break. The call flow 500 assumes video streaming is provided through a web page interface and streaming media player installed at the client device; however, the inventive concepts herein are not limited to such environments. If a web page environment is used, a call flow may initiate, at 506, with the client device 502 displaying a web (e.g., World Wide Web) page received from the server system 504 including links for requesting one or more video segments. For example, the web page may comprise a "home" or personalized page including a list of selected video segments of general interest, or selected as likely to be of interest to a specific user based on a user profile. The client device may receive 506 user input selecting one of the links, for example, a "point and click" input from a pointing device, a touch input on a touchscreen device, or a spoken command. In response to the input, the client device may request a specific video segment 508 by transmitting a Hypertext Transfer Protocol (HTTP) "get" request, or other suitable request message, to the server system 504. The server may retrieve and/or create configuration data for a streaming session, and retrieve the content data from a data store.

At 510, the server may determine ad breaks in the video content and select a plurality of alternative ads for at least the next ad break, where the number of alternative ads is greater than the number of ads needed to fill the at least next ad break. At 512, the server may provide the configuration data, streaming content data, and information for the alternative ads (e.g., description and thumbnail image) to the client device 502. It should be appreciated that the client 502 may play the streaming content 514 as it is received, so to a certain extent the operations 512 and 514 may occur contemporaneously.

While playing the streaming video 514, and in advance of the next ad break in the video content, the client device 502 may execute a user interface process presenting the alternative ad information on the client display in a location near an output window for the video content, and enabling user selection input of any one or more of the alternative ads while the video content continues to play. Thus, the user may select from the alternative ads without any interruption of the playing experience. Instead, the interface process may enable user-initiated ad selection for the next ad break in parallel with viewing the video content. An example of one such interface process is described later in the specification. At 516, again prior to the next ad break, the client may receive user input selecting one or more of the alternative ads, and at 518, transmit an identifier of the selected ad or ads to the server 504. In response to receiving the identifier or identifiers, the server may, at 522, retrieve the selected one or ones of the alternative ads, and/or otherwise prepare for streaming the selected ad to the client.

In an aspect, an alternative ad selected by the client for the first next ad break may be considered by the server system when selecting alternative ads for the second next ad break (i.e., the ad break that comes after the most-imminent next ad break). For example, as indicated at 521, the server may store the ad identifier for the alternative ad selected by the user in a memory location accessible to the ad selection routine 510, to be used the next time that the system determines alternative ad candidates or for some defined number of subsequent ad breaks. The identity of the selected ad may be useful for avoiding undesirable repetition of an ad that has already been selected and viewed by the user. Taking a special action to store an identifier for the selected ad may not be necessary when the user selects (or implicitly accepts) a default ad for the next ad break, because the system may store the default ad identifiers in advance and adopt an assumption that default ads were previously used unless a different selection is indicated.

At 520, the client 502 may detect that a defined ad break is about to occur (for example, in 1, 2 or 3 seconds from a current frame). In response to detecting the incipient ad break, the client 502 may, at 524, provide a signal to the server 504 that an ad break is imminent. In response to receiving the signal, the server system 504 may, at 526, stream the user-selected ad or ads previously prepared in response to the request 518. The client device may then, at 528, play the user-selected ad or ads during the next ad break.

As play of the alternative ad, or each of such ads, is finished, the client device 502 may, at 530, transmit a signal (e.g., "end beacon") to the server system indicating that play of the user-selected alternative ad was completed at the client. The server 504 may use the signal to trigger an accounting function 534 for advertising commerce, ad tracking, and similar purposes. Meanwhile, at 532, the client device 502 may continue to play the streaming video content, and the system 500 may repeat the processes 510-534 beginning prior to each subsequent next ad break until the video content completes playing or play is terminated by the user.

Thus, the client device 502 and server system 504 may cooperate to produce video output configured based on user input to an interactive next ad break ad selection process. The next ad break ad selection process may therefore operate to transform data representing video output to a different state, while engaging the user of the video streaming service in an entertaining and rewarding activity and enhancing enjoyment of the video streaming service, without causing any additional interruption or delay in the user experience.

Figure 6A:
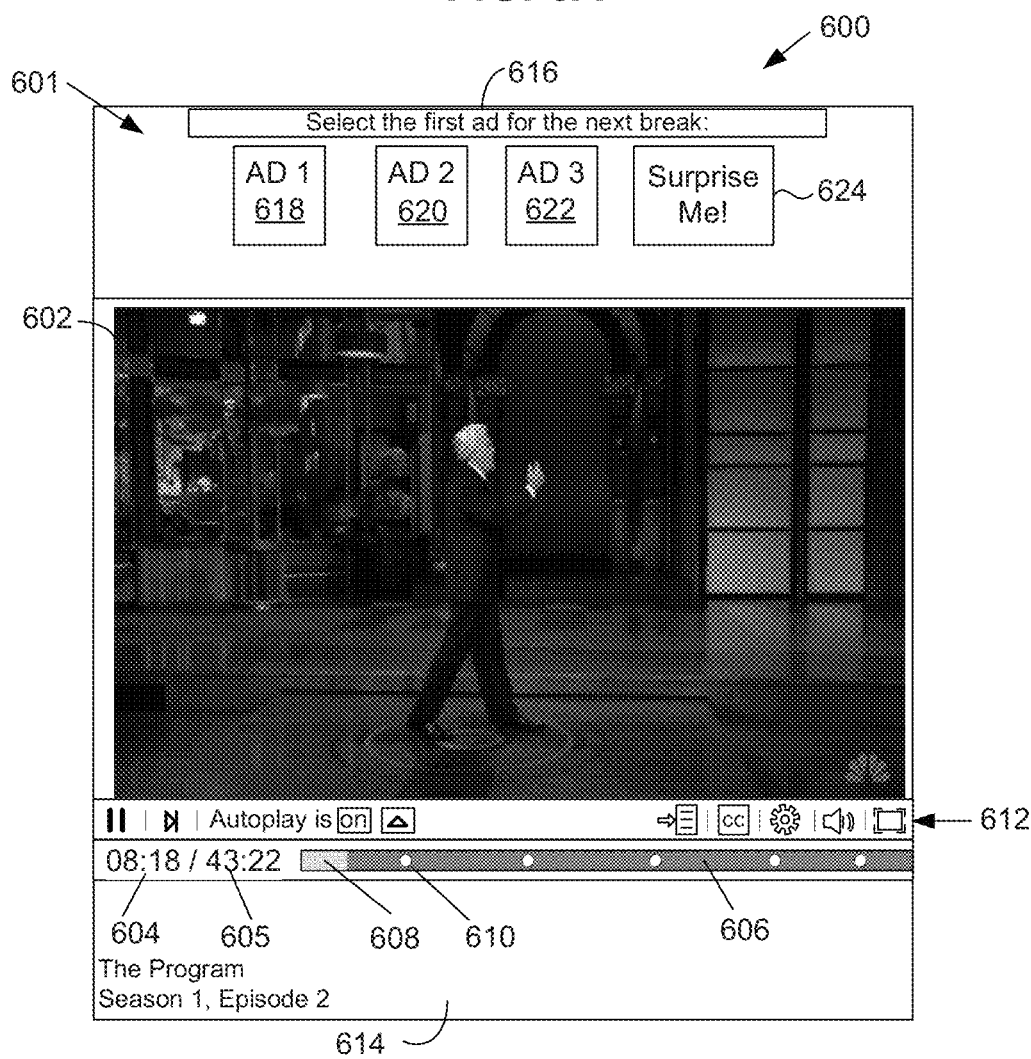
FIGS. 6A-B illustrate screenshots of next ad selector interface inviting user selection of advertising in a streaming video segment, at different times.

FIG. 6A illustrates a simplified screenshot 600 of a user interface 601 for a client device enabling user selection from an alternative ad set prior to a next ad break, without interrupting play of video content in an adjacent video window 602. The screenshot 600 includes a lower band 614 including an assortment of tool icons 612 and other indicators, a current time indicator 604, video length indicator 605, and time line 606. A progress bar 608 indicates that play of the video content in the window 602 has not yet reached the first ad break 610. Subsequent ad breaks in the time line 606 are indicated by the markers to the right of the first ad break marker 610. Because play has not yet reached the first marker 610, at the illustrated time of play, the break indicated by the marker 610 is the next ad break.

Figure 6B:
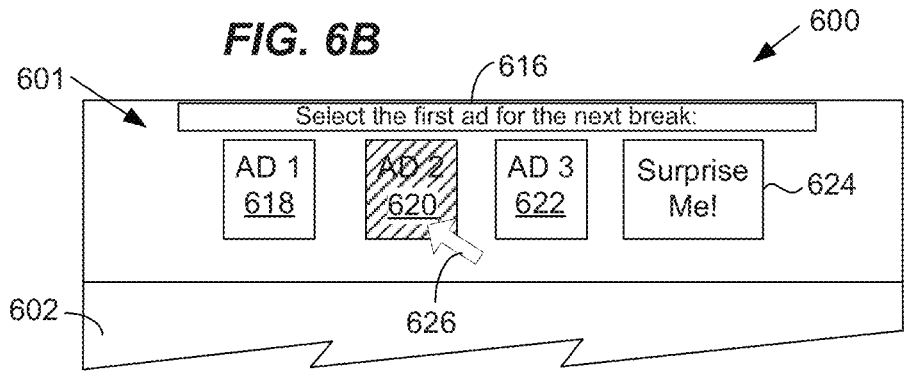

Thus, the screenshot 600 illustrates that prior to the next ad break, the client device outputs the user interface 601, including an instruction message 616 and the four selectable objects 618, 620, 622 and 624. The message 616 may indicate which ad of an ad pod is being selected; here, the message indicates the first ad is being selected. Each of the objects 618, 620 and 622 may include a thumbnail image and/or brief description of a corresponding one of a set of alternative ads selected by the system for the ad break. An additional icon 624 may be provided to enable a user to affirmatively opt out of ad selection. A user may also opt out of ad selection merely by ignoring the user interface 601 entirely. The interface may respond to user input indicating user selection of any one of the selectable objects 618, 620, 622 and 624. For example, as shown in FIG. 6B, the selectable object 620 is highlighted in response to user input received via a cursor 626 or other input mechanism, indicating that the user has selected "Ad 2" as the ad to play in the first position of an ad pod.

Because more than one ad may play during an ad break, the interface 601 may enable user selection of more than one ad for an ad break. For example, after a user has selected the first ad as shown at FIG. 6B, the interface may be updated to enable selection of a second ad, as shown in FIG. 7. The updated interface 701 as shown at FIG. 8 may be output after the first selection interface 601, and still prior to the next ad break. At this subsequent time, the message 702 may be updated to indicate that the second ad may be selected, and a different set of selectable objects 704, 706 and 708 may be displayed, corresponding to a different set of alternative ads. Still prior to the ad break, the user may select a second ad from the new alternative ads. For example, as shown in FIG. 8, the user has selected "Ad 4" as indicated by the highlighted selectable object 704. It should be appreciated that the interface as described in connection with FIGS. 6A-8 is merely an example, the details of which should not be understood as limiting the present methods and systems for selection of alternative ads for next ad breaks.

The foregoing examples may be embodied in one or more methodologies performed by a computer, for example a client device, server, or some combination of a client device and server. Methodologies that may be implemented in accordance with the disclosed subject matter will be better appreciated with reference to various flow charts. Although methodologies are shown and described as a series of acts/blocks for simplicity of illustration, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture, for example, a non-transitory computer-readable medium, to facilitate storing, transporting and transferring such methodologies to various devices. Those skilled in the art will understand and appreciate that a method could alternatively be represented as a series of interrelated states or events, such as in a state diagram.

Video Host Server Operations and Apparatus

Figure 9:
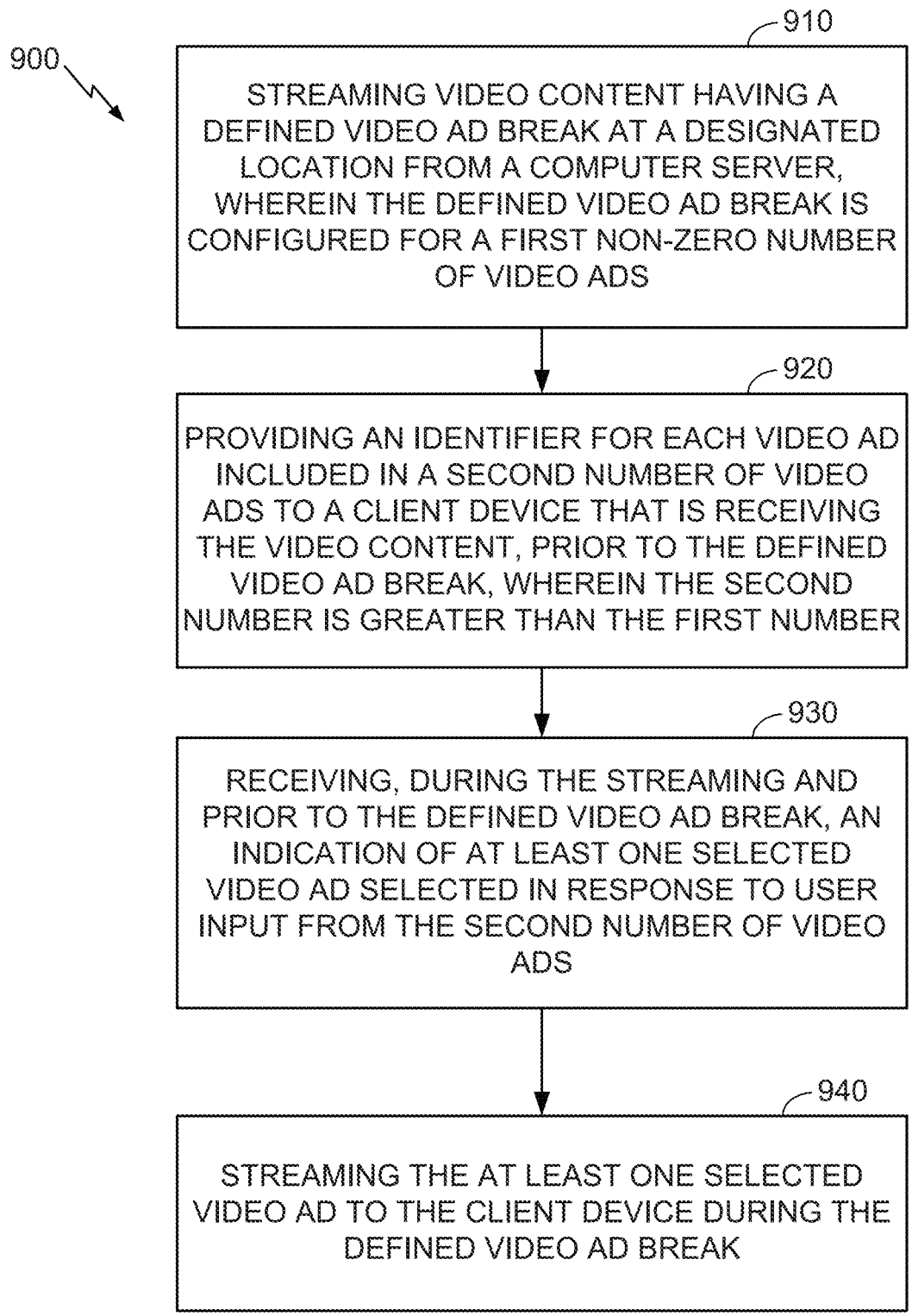

As shown in FIG. 9, a network node of a computer server system may perform a method 900 for user selection of video advertising for a next ad break of a streaming video segment. The method 900 may include at 910, streaming video content having a defined video ad break at a designated location from a computer server, wherein the defined video ad break is configured for a first non-zero number of video ads. The defined video ad break may be the next ad break in a video program that is playing, or about to be played, on a client device. The first number of video ads may be a number of video ads in the ad break for which user selection of an alternative ad is enabled. For example, an ad break may be designed to play one, two, three, or other number of ads based on the length of the break and the planned ads. The system may enable all of, or some subset of, the possible ads required to fill the break to be determined by user selection. The system may select default ads for the defined ad break prior to presenting alternative ad identifiers for user selection; or in the alternative, the system may not select default ads until the user passes up an opportunity to select ads for the break.

The method 900 may further include, at 920, providing an identifier for each video ad included in a second number of video ads to a client device that is receiving the video content, prior to the defined video ad break, wherein the second number is greater than the first number. Here, the second number of video ads refers to the number of alternative ad options provided by the system to the client device for an ad break, and the first number refers to a number between 1 and 'n', wherein 'n' is the total number of ads required to fill the next ad break. For example, if the upcoming ad break will be used to play two video ads, and the systems enables user selection for both ads, then the first number is two and the second number is some integer greater than two, for example four. The video host server may provide a thumbnail image representing each alternative ad, a text description, and a unique identifier identifying the video segment for playing the ad on the client device.

The method 900 may further include, at 930, receiving, during the streaming and prior to the defined video ad break, an indication of at least one selected video ad selected from the second number of video ads in response to user input. For example, user selection of an interactive thumbnail object on the client device may cause the client to transmit an identifier for a corresponding one of the alternative ads to the host server. The method 900 may further include, at 940, streaming the at least one selected video ad to the client device during the defined video ad break.

Figure 11A:
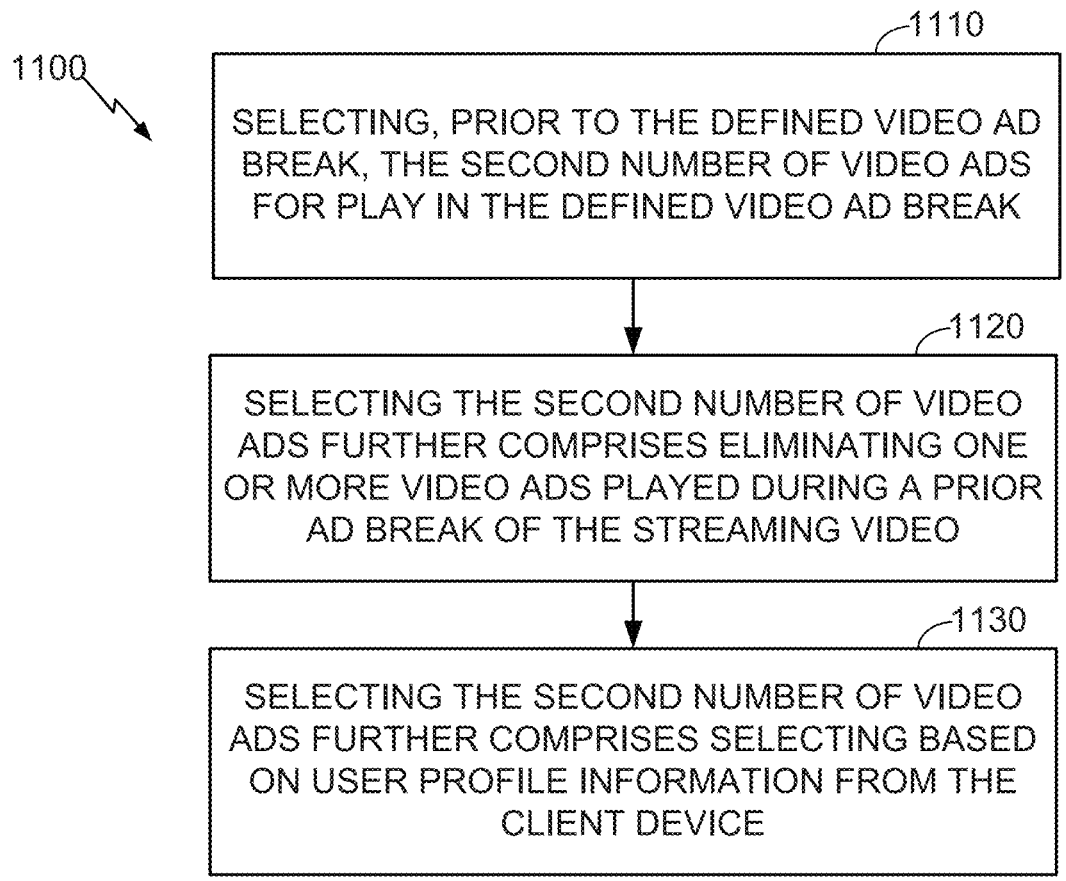
Figure 11B:
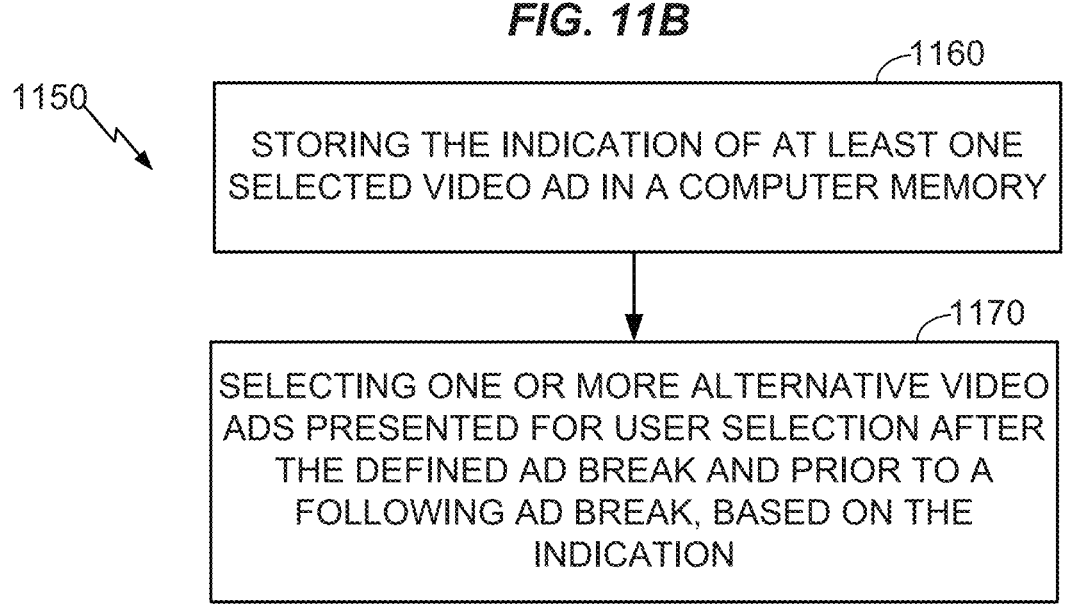

With reference to FIGS. 10-11B, several additional operations 1000, 1100 and 1150 are depicted for a next ad break ad selection process, which may be performed by a computer server, alone or in combination with a client device and/or another server. One or more of operations 1000, 1100 and 1150 may optionally be performed as part of method 900. The elements of these operations may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 900 includes at least one of the operations 1000, 1100 and 1150, then the method 900 may terminate after the at least one operation, without necessarily having to include any subsequent downstream operation(s) that may be illustrated.

In an aspect, with reference to FIG. 10, the method 900 may further include, at 1010, configuring an interactive object for operating on the client device during the streaming video to process the indication based on user input. For example, the server may provide data to a user interface module in a web page, including thumbnail images and/or other descriptive data representing the alternative advertisements selected by the server, related to ad identifiers for indicating which, if any, of the alternative ads are selected by a user.

The method 900 may further include, at 1020, serving the interactive object to the client device during the streaming. For example, the interactive object may comprise an applet or widget that may be downloaded to the client in response to a user selection action during streaming of video content to the client device. In the alternative, the method 900 may further include, at 1030, serving the interactive object to the client device prior to the streaming, configured to be activated after the streaming is initiated. For example, the interactive object may be included in and downloaded with a web page for displaying the video content and related information. The object may then be activated and displayed at appropriate times according to a script or other instructions running on the web page or other interface.

In further aspects, the method 900 may further include, at 1040, configuring the interactive object to appear as a selectable object near a window in which the video content is being displayed on the client device. For example, the object may appear near a video window as depicted in FIGS. 6A-8. The method 900 may further include, at 1050, configuring the interactive object to appear as a selectable object overlying the video content on the client device. For example, a similar object to that depicted herein may be overlain as a semitransparent object appearing over the video content.

In another aspect, with reference to FIG. 11A, the method 900 may further include, at 1110, selecting, prior to the defined video ad break, the second number of video ads for play in the defined video ad break. The server may select a number of alternative ads that is some multiple (greater than 1) of the number of ads needed to fill an ad break, or some constant number (1 or greater) than the number of ads needed to fill the break. In another aspect, the method 900 may further include, at 1120, selecting the second number of video ads further including eliminating one or more video ads played during a prior ad break of the streaming video. For example, if ad selection selects an ad recently played on the client device, either during the same program or during an earlier program, the server may remove the ad from the set of alternative ads, and replace it with an alternate. This operation 1120 may be conducted according to a rule set for preventing particular ads from being played too frequently on the same client device.

Ad selection may be performed based on any suitable parameter, including for example client viewing or browsing history, user preferences of profile, geographic location, or time of day. For example, the method 900 may further include at 1130, selecting the second number of video ads further based on user profile information from the client device. The selecting may begin after play of the video content (i.e., the program in which one or more of the alternative ads is to appear during a break) and before an ad break is to appear.

The system may use alternative ad selections by users for earlier ad breaks in selecting alternative ads for presenting to users for subsequent ad breaks. For example, with reference to FIG. 11B, the method 900 may include, at 1160, storing the indication of at least one selected video ad in a computer memory. For example, if the user selects two ads out of a total of four alternative ads presented, the server may store identifiers for the two selected ads in a server memory. After the ad break, as the video content continues to play and prior to the next ad break in the content, the server may select additional alternative ads based on the stored identifiers. For example, the server may avoid re-selecting the same ads or may select ads for complementary products. Accordingly, the method 900 may further include, at 1170, selecting one or more alternative video ads presented for user selection after the defined ad break and prior to a following ad break, based on the indication stored in the computer memory.

Figure 12:
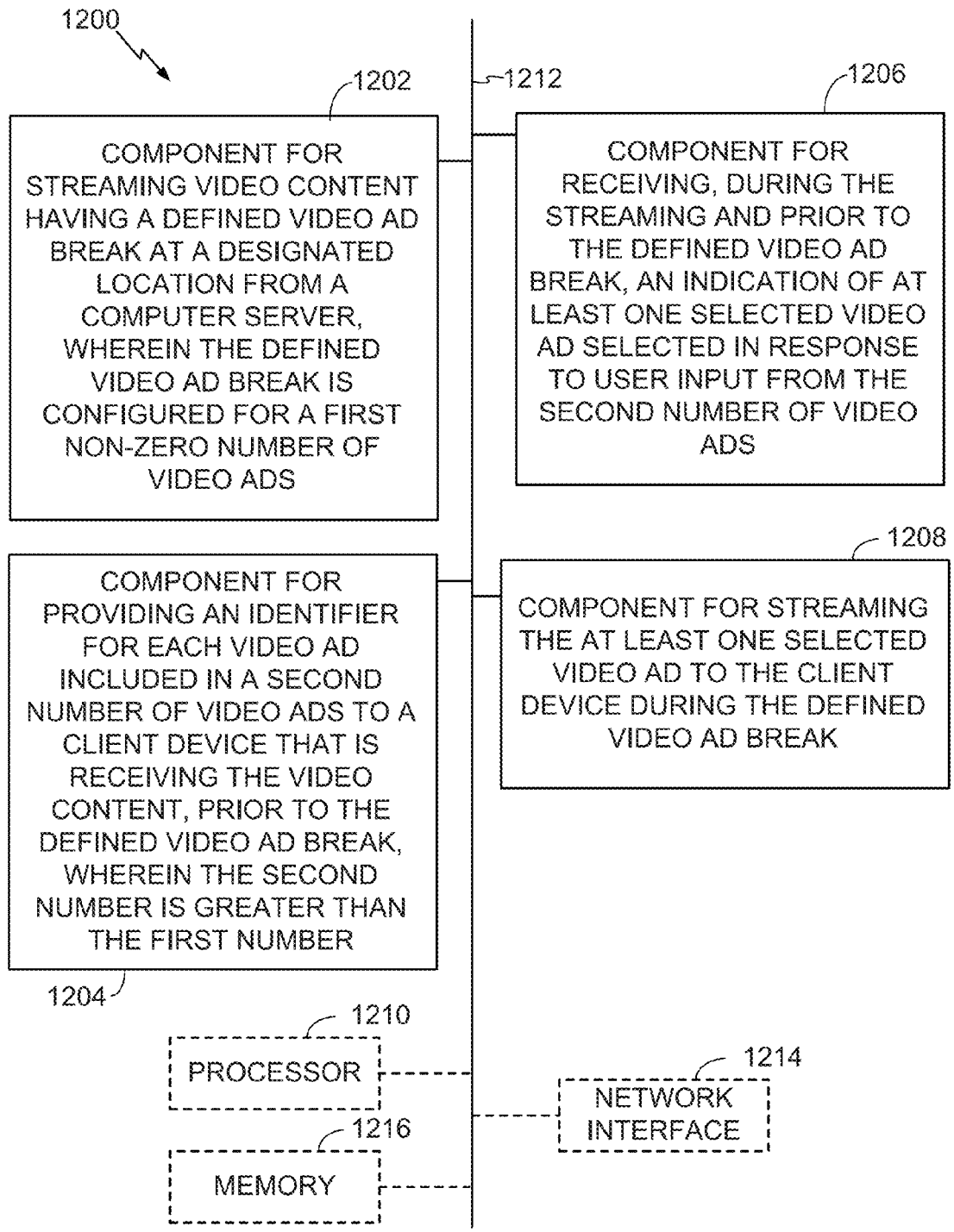
FIG. 12 is a diagram illustrating a network node configured for user control of ad selection for a subsequent ad break of a streaming video.

With reference to FIG. 12, there is provided an exemplary apparatus 1200 that may be configured as computer server, for implementing a next ad break ad selection process in a streaming video system. As illustrated, in one embodiment, the apparatus 1200 may include an electrical component or means 1202 for streaming video content having a defined video ad break at a designated location from a computer server, wherein the defined video ad break is configured for a first non-zero number of video ads. For example, the electrical component or means 1202 may include at least one control processor 1210 coupled to a memory component 1216. The control processor may operate an algorithm, which may be held as program instructions in the memory component. The algorithm may include, for example, receiving a request for video content from a client device, initiating a streaming session with the client device, retrieving the requested video content, determining a configuration of one or more ad breaks in the streaming session, based on one or more of content parameters, user or client device attributes, or other attributes, and streaming the requested content to the client device using a streaming protocol.

The apparatus 1200 may further include an electrical component or module 1204 for providing an identifier for each video ad of a second number of video ads to a client device that is receiving the video content, prior to the defined video ad break, wherein the second number is greater than the first number. For example, the electrical component or means 1204 may include at least one control processor 1210 coupled to a memory component 1216. The control processor may operate an algorithm, which may be held as program instructions in the memory component. The algorithm may include, for example, selecting a set of alternative ads for an ad break that is some quantity larger than the number of ads needed for the ad break. For example, the algorithms may select "n+C" number of alternative ads for an upcoming ad break, wherein 'n' is the number of ads needed to fill the break, and 'C' is some constant number such as, for example, two, three, four or five. Alternative ads may be selected using any suitable algorithm such as used by server-side ad systems for automatically selecting video ads for a streaming video session.

The apparatus 1200 may further include an electrical component or module 1206 for receiving, during the streaming of the video content and prior to the defined video ad break, an indication of at least one selected video ad selected in response to user input from the second number of video ads. For example, the electrical component or means 1206 may include at least one control processor 1210 coupled to a memory component 1216. The control processor may operate an algorithm, which may be held as program instructions in the memory component. The algorithm may include, for example, receiving a signal transmitted from the client device during the streaming session after a most recent ad break and prior to the next ad break, and parsing the signal to obtain an indication of one or more selected ads for the ad break. The algorithm may further include detecting the absence of a user-selection signal, and/or detecting an affirmative signal indicating that the user has declined to select at least one of the alternative ads.

The apparatus 1200 may further include an electrical component or module 1208 for streaming the at least one selected video ad to the client device during the defined video ad break. For example, the electrical component or means 1208 may include at least one control processor 1210 coupled to a memory component 1216. The control processor may operate an algorithm, which may be held as program instructions in the memory component. The algorithm may include, for example, requesting the one or more user-selected ads from a video ad server, and streaming the one or more user-selected ads to the client device as part of a streaming session, during the ad break.

The apparatus 1200 may include similar electrical components for performing any or all of the additional operations 1000-1150 described in connection with FIGS. 10-11B, which for illustrative simplicity are not shown in FIG. 12.

In related aspects, the apparatus 1200 may optionally include a processor component 1210 having at least one processor. The processor 1210 may be in operative communication with the components 1202-1208 or similar components via a bus 1212 or similar communication coupling. The processor 1210 may effect initiation and scheduling of the processes or functions performed by electrical components 1202-1208.

In further related aspects, the apparatus 1200 may include a network interface component 1214 enabling communication between a client and a server. The apparatus 1200 may optionally include a component for storing information, such as, for example, a memory device/component 1216. The computer readable medium or the memory component 1216 may be operatively coupled to the other components of the apparatus 1200 via the bus 1212 or the like. The memory component 1216 may be adapted to store computer readable instructions and data for implementing the processes and behavior of the components 1202-1208, and subcomponents thereof, or the processor 1210, or the methods disclosed herein. The memory component 1216 may retain instructions for executing functions associated with the components 1202-1208. While shown as being external to the memory 1216, it is to be understood that the components 1202-1208 can exist within the memory 1216.

Client-Side Operations and Apparatus

Figure 13:
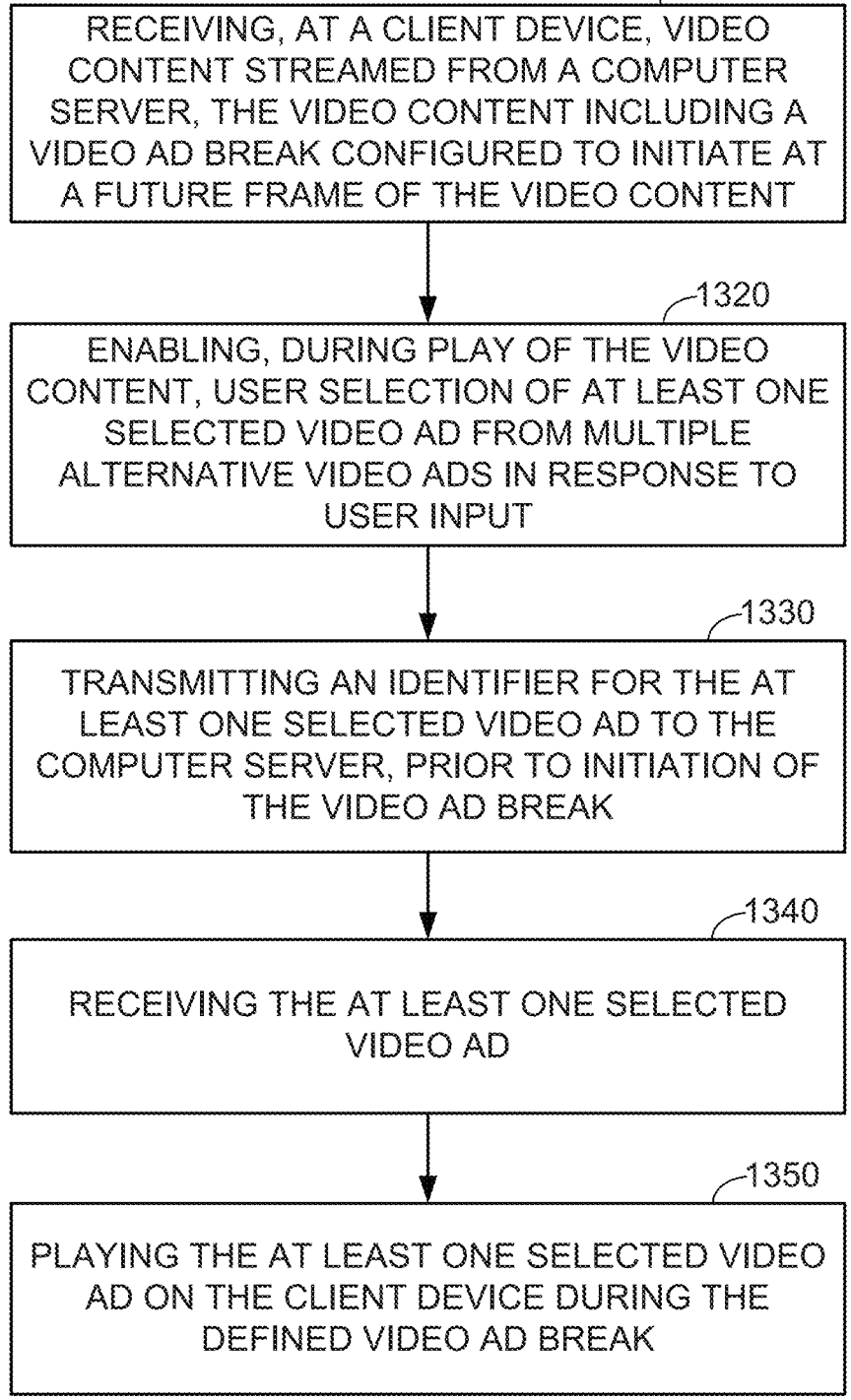
FIGS. 13-14 are diagrams illustrating operations that may be performed by a client device in connection with user control of ad selection for a subsequent ad break of a streaming video.

A method 1300 shown in FIG. 13 may be performed by a client device for user selection of alternative video ads prior to a next ad break of a streaming video segment, and communicating with an ad server system. The method 1300 may include, at 1310, receiving, at a client device, video content streamed from a computer server, the video content including a video ad break configured to initiate at a future frame of the video content. For example, a personal computer, smart phone, notepad or notebook computer, laptop computer, smart TV, or other client device may receive video content for a program of a streaming video service using a protocol selected from RSTP or UDP.

The method 1300 may further include, at 1320, enabling, during play of the video content, user selection of at least one selected video ad from multiple alternative video ads in response to user input. For example, the client player may activate an interactive object as described above in connection with FIGS. 6A-8 and below in connection with FIG. 14, after initiating play of the video program (e.g., after the most recent ad break) and some period of time (e.g., 60 seconds) prior to the next ad break.

The method 1300 may further include, at 1330, transmitting an identifier for the at least one selected video ad to the computer server, prior to initiation of the video ad break. For example, prior to the next ad break, the client device may receive user input indicating the selection of one or more video ads from a set of alternative ads presented via a user interface on the client device. In response to receiving the user input, the client device may transmit corresponding identifiers to the streaming video server for the one or more user-selected ads.

The method 1300 may further include, at 1340, receiving the at least one selected video ad. For example, the client may receive one or more video ads streamed from the host server, wherein each of the video ads corresponds to an identifier for the user-selected video ad or ads transmitted by the client to the server. The method 1300 may further include, at 1350, playing the at least one selected video ad on the client device during the defined video ad break. For example, using a media player component, the client may play the streaming video ad in a window of a user interface, causing a video output on a display device.

It should be appreciated that the operations described in connection with the method 1300 may involve operations of a computer server to the extent that the client device is operating as a dumb terminal or portal to a process occurring at a different computer. Various distributions of these operations may be implemented between a client device and host device, without departing from the scope of the method 1300.

Figure 14:
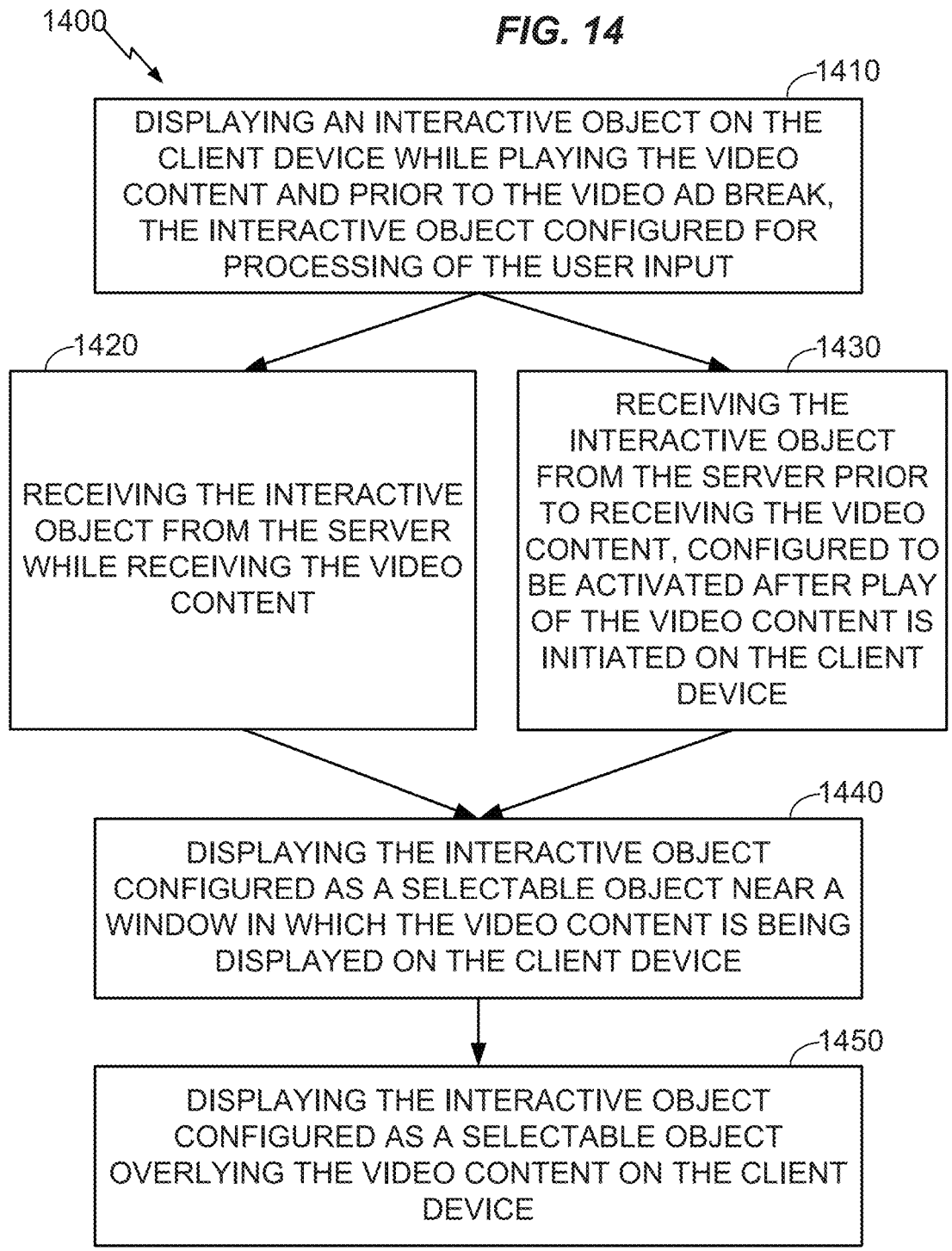

With reference to FIG. 14, several additional operations 1400 are depicted for implementing next ad break ad selection, which may be performed by a client device, alone or in combination with a server. One or more of these operations may optionally be performed as part of the method 1300. The elements of these operations may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 1300 includes at least one of the operations 1400, then the method 1300 may terminate after the at least one operation, without necessarily having to include any subsequent downstream operation(s) that may be illustrated.

In an aspect, with reference to FIG. 14, the method 1300 may further include, at 1410, displaying an interactive object on the client device while playing the video content and prior to the video ad break, wherein the interactive object is configured for processing of the user input. For example, the client may display an interface as shown in FIGS. 6A-8, using an applet or widget to display alternative ad information from the video streaming system in a user interface.

In one aspect, the method 1300 may further include, at 1420, receiving the interactive object from the server while receiving the video content. For example, the interactive object may comprise a portion of playable content or ancillary content that is executed during play of the primary video content. In an alternative aspect, the method 1300 may further include, at 1430, receiving the interactive object from the server prior to receiving the video content, configured to be activated after play of the video content is initiated on the client device. For example, an application or applet for user selection of the next ad may be installed as a component of the client device, and called at appropriate times by an application controlling play of the primary video content on the client device.

In addition, the method 1300 may further include, at 1440, displaying the interactive object configured as a selectable object near a window in which the video content is being displayed on the client device. For example, the client device may generate a display similar to that shown in FIGS. 6A-8. The method 1300 may further include, at 1450, displaying the interactive object configured as a selectable object overlying the video content on the client device. For example, the interactive object may be configured and presented as a semi-transparent interactive object lying over a portion of the video window.

Figure 15:
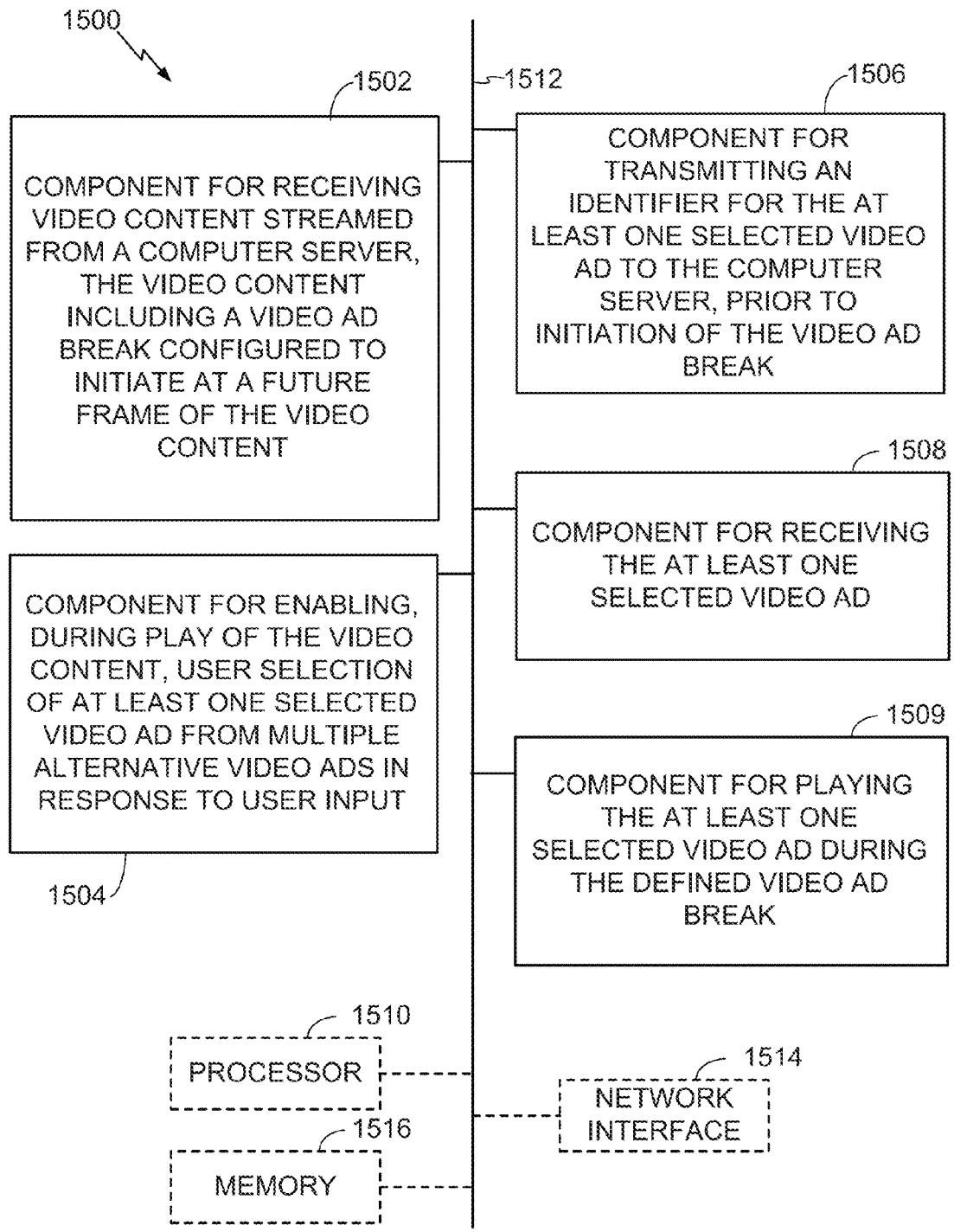
FIG. 15 is a diagram illustrating a client device configured for user control of ad selection for a subsequent ad break of a streaming video.

With reference to FIG. 15, there is provided an exemplary apparatus 1500 that may be configured as client device or combination of client and server, for implementing a next ad break ad selection process on a client device. The apparatus 1500 may include functional blocks that can represent functions implemented by a processor, software, or combination thereof (e.g., firmware).

As illustrated, in one embodiment, the apparatus 1500 may include an electrical component or means 1502 for receiving video content streamed from a computer server, the video content including a video ad break configured to initiate at a future frame of the video content. For example, the electrical component or means 1502 may include at least one control processor 1510 coupled to a memory component 1516. The control processor may operate an algorithm, which may be held as program instructions in the memory component. The algorithm may include, for example, receiving data packets at a client device, recognizing streaming video packets based on header information, routing streaming video packets to a streaming client application, assembling the packets into a video data sequence, and playing the video data sequence using a media player application.

The apparatus 1500 may further include an electrical component or module 1504 for enabling, during play of the video content, user selection of at least one selected video ad from multiple alternative video ads in response to user input. For example, the electrical component or means 1504 may include at least one control processor 1510 coupled to a memory component 1516. The control processor may operate an algorithm, which may be held as program instructions in the memory component. The algorithm may include, for example, selectively enabling a user selection object or interface after a most recent ad break and prior to the next ad break in a streaming video session, wherein the user selection object or interface presents alternative ads for selection by the user, and monitoring user input to the client device to detect user selection events while the user selection object or interface is enabled. As previously described, the client device detects this user input while the primary video content is playing; i.e., between adjacent ad breaks of a streaming video program, or between the beginning of a streaming video program and the first ad break in the program. The algorithm may limit selection of alternative ads to ads that will appear in the next ad break.

The apparatus 1500 may further include an electrical component or module 1506 for transmitting an identifier for the at least one selected video ad to the computer server, prior to initiation of the video ad break. For example, the electrical component or means 1506 may include at least one control processor 1510 coupled to a memory component 1516. The control processor may operate an algorithm, which may be held as program instructions in the memory component. The algorithm may include, for example, detecting user selection input indicating the selection of one or more ads prior to a next ad break, and transmitting a signal to a host server indicating identities of the one or more ads prior to the next ad break. If the user does not select any alternative ads, the server system may use the absence of a selection signal from the client device as an implied signal to use default ads for the video break.

The apparatus 1500 may further include an electrical component or module 1508 for receiving the at least one selected video ad. For example, the electrical component or means 1508 may include at least one control processor 1510 coupled to a memory component 1516. The control processor may operate an algorithm, which may be held as program instructions in the memory component. The algorithm may include, for example, the same operations as described in connection with component 1502 for receiving primary video content, with the exception that packets for user-selected video ads are sequenced for play during a planned video ad break. If there is no user-selected ad for a particular ad break, the host server may stream a default or system-selected video ad for play during the ad break.

The apparatus 1500 may further include an electrical component or module 1509 for playing the at least one selected video ad during the defined video ad break. For example, the electrical component or means 1509 may include at least one control processor 1510 coupled to a memory component 1516. The control processor may operate an algorithm, which may be held as program instructions in the memory component. The algorithm may include, for example, providing a video stream assembled from packets received by the client to a media player component operating on the client, and outputting a resulting video signal from the media player component to a display device, which displays the user-selected alternative ad during the next ad break.

The apparatus 1500 may include similar electrical components for performing any or all of the additional operations 1400 described in connection with FIG. 14, which for illustrative simplicity are not shown in FIG. 15.

In related aspects, the apparatus 1500 may optionally include a processor component 1510 having at least one processor, in the case of the apparatus 1500 configured to include a processor for a client device. The processor 1510 may be in operative communication with the components 1502-1509 or similar components via a bus 1512 or similar communication coupling. The processor 1510 may effect initiation and scheduling of the processes or functions performed by electrical components 1502-1509.

In further related aspects, the apparatus 1500 may include a network interface component 1514 enabling communication between a client and a server. The apparatus 1500 may include a component for storing information, such as, for example, a memory device/component 1516. The computer readable medium or the memory component 1516 may be operatively coupled to the other components of the apparatus 1500 via the bus 1512 or the like. The memory component 1516 may be adapted to store computer readable instructions and data for implementing the processes and behavior of the components 1502-1509, and subcomponents thereof, or the processor 1510, or the methods disclosed herein. The memory component 1516 may retain instructions for executing functions associated with the components 1502-1509. While shown as being external to the memory 1516, it is to be understood that the components 1502-1509 can exist within the memory 1516.

It is understood that the specific order or hierarchy of steps in the processes disclosed are merely examples. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:
1. A method, comprising:
sending video content having a defined video ad break at a designated location from a computer server to a client device, wherein the defined video ad break is configured for a first non-zero number of video ads;
determining a second number of video ads during the sending of the video content to the client device;
providing an identifier for each video ad included in the second number of video ads to the client device that is receiving the video content, prior to the defined video ad break and upon starting of the sending of the video content, wherein the second number is greater than the first number, and wherein information for the second number of video ads is concurrently displayed at the client device upon playing of the video content and prior to the defined video ad break;

receiving, during the sending and prior to the defined video ad break, an indication of at least one selected video ad selected based on the information for the second number of video ads in response to a user input; and sending the at least one selected video ad to the client device during the defined video ad break.

2. The method of claim 1, further comprising configuring an interactive object for operating on the client device during the sending of the video content to display the information for the second number of video ads and process the indication based on the user input.

3. The method of claim 2, further comprising serving the interactive object to the client device during the sending of the video content.

4. The method of claim 2, further comprising serving the interactive object to the client device prior to the sending of the video content, configured to be activated after the sending of the video content is initiated.

5. The method of claim 2, further comprising configuring the interactive object to appear as a selectable object near a window in which the video content is being displayed on the client device.

6. The method of claim 2, further comprising configuring the interactive object to appear as a selectable object overlying the video content on the client device.

7. The method of claim 1, wherein the second number of video ads are determined prior to the defined video ad break for play in the defined video ad break.

8. The method of claim 7, wherein the determining the second number of video ads further comprises eliminating one or more video ads played during a prior ad break of the video content.

9. The method of claim 7, wherein the determining the second number of video ads further comprises selecting at least a portion of the second number of video ads based on user profile information from the client device.

10. The method of claim 1, further comprising storing the indication of at least one selected video ad in a computer memory; and selecting one or more alternative video ads presented for user selection after the defined ad break and prior to a following ad break, based on the indication.

11. An apparatus, comprising:

at least one computer processor configured for:

sending video content having a defined video ad break at a designated location from a computer server to a client device, wherein the defined video ad break is configured for a first non-zero number of video ads;

determining a second number of video ads during the sending of the video content to the client device;

providing an identifier for each video ad included in the second number of video ads to the client device that is receiving the video content, prior to the defined video ad break and upon starting of the sending of the video content, wherein the second number is greater than the first number, and wherein information for the second number of video ads is concurrently displayed at the client device upon playing of the video content and prior to the defined video ad break;

receiving, during the sending and prior to the defined video ad break, an indication of at least one selected video ad selected based on the information for the second number of video ads in response to a user input; and sending the at least one selected video ad to the client device during the defined video ad break; and a memory coupled to the at least one computer processor for storing data.

12. The apparatus of claim 11, wherein the at least one computer processor is further configured for configuring an interactive object for operating on the client device during the sending of the video content to display the information for the second number of video ads and process the indication based on the user input.

13. The apparatus of claim 12, wherein the at least one computer processor is further configured for serving the interactive object to the client device during the sending of the video content.

14. The apparatus of claim 12, wherein the at least one computer processor is further configured for serving the interactive object to the client device prior to the sending of the video content, configured to be activated after the sending is initiated.

15. The apparatus of claim 12, wherein the at least one computer processor is further configured for configuring the interactive object to appear as a selectable object near a window in which the video content is being displayed on the client device.

16. The apparatus of claim 12, wherein the at least one computer processor is further configured for configuring the interactive object to appear as a selectable object overlying the video content on the client device.

17. The apparatus of claim 11, wherein the second number of video ads are determined prior to the defined video ad break for play in the defined video ad break.

18. The apparatus of claim 17, wherein the at least one computer processor is further configured for determining the second number of video ads comprising eliminating one or more video ads played during a prior ad break of the video content.

19. The apparatus of claim 17, wherein the at least one computer processor is further configured for determining the second number of video ads comprising selecting at least a portion of the second number of video ads based on user profile information from the client device.

20. The apparatus of claim 11, wherein the at least one computer processor is further configured for storing the indication of at least one selected video ad; and selecting one or more alternative video ads presented for user selection after the defined ad break and prior to a following ad break, based on the indication.

21. A computer program product, comprising:

a non-transitory computer-readable medium comprising code for:

sending video content having a defined video ad break at a designated location from a computer server to a client device, wherein the defined video ad break is configured for a first non-zero number of video ads;

determining a second number of video ads during the sending of the video content to the client device;

providing an identifier for each video ad included in the second number of video ads to the client device that is receiving the video content, prior to the defined video ad break and upon starting of the sending of the video content, wherein the second number is greater than the first number, and wherein information for the second number of video ads is concurrently displayed at the client device upon playing of the video content and prior to the video ad break;

receiving, during the sending and prior to the defined video ad break, an indication of at least one selected video ad selected based on the information for the second number of video ads in response to a user input; and sending the at least one selected video ad to the client device during the defined video ad break.

22. A method, comprising:
receiving, at a client device, video content sent from a computer server, the video content including a video ad break configured to initiate at a future point of the video content;
enabling, concurrently during play of the video content, display of multiple alternative video ads determined upon starting of the receiving of the video content and prior to the defined video ad break;
enabling, concurrently during play of the video content, user selection of at least one selected video ad from the multiple alternative video ads in response to a user input prior to the defined video ad break and upon starting of the receiving of the video content;
transmitting an identifier for the at least one selected video ad prior to initiation of the video ad break;
receiving the at least one selected video ad; and
playing the at least one selected video ad on the client device during the defined video ad break.

23. The method of claim 22, further comprising displaying an interactive object on the client device while playing the video content and prior to the video ad break, the interactive object configured for displaying the multiple alternative ads and processing of the user input.

24. The method of claim 23, further comprising receiving the interactive object from the server while receiving the video content.

25. The method of claim 23, further comprising receiving the interactive object from the server prior to receiving the video content, wherein the interactive object is configured to be activated after play of the video content is initiated on the client device.

26. The method of claim 23, further comprising displaying the interactive object configured as a selectable object near a window in which the video content is being displayed on the client device.

27. The method of claim 23, further comprising displaying the interactive object configured as a selectable object overlying the video content on the client device.

28. An apparatus, comprising:
at least one computer processor configured for:
receiving video content sent from a computer server, the video content including a video ad break configured to initiate at a future point of the video content;
enabling, concurrently during play of the video content, display of multiple alternative video ads determined upon starting of the receiving of the video content and prior to the defined video ad break;
enabling, concurrently during play of the video content, user selection of at least one selected video ad from the multiple alternative video ads in response to a user input prior to the video ad break and upon starting of the receiving of the video content;
transmitting an identifier for the at least one selected video ad prior to initiation of the video ad break;
receiving the at least one selected video ad;
playing the at least one selected video ad during the defined video ad break; and
a memory coupled to the at least one computer processor for storing data.

29. The apparatus of claim 28, wherein the at least one computer processor is further configured for displaying an interactive object while playing the video content and prior to the video ad break, the interactive object configured for displaying the multiple alternative ads and processing of the user input.

30. The apparatus of claim 29, wherein the at least one computer processor is further configured for receiving the interactive object from the server while receiving the video content.

31. The apparatus of claim 29, wherein the at least one computer processor is further configured for receiving the interactive object from the server prior to receiving the video content, wherein the interactive object is configured to be activated after play of the video content is initiated.

32. The apparatus of claim 29, wherein the at least one computer processor is further configured for displaying the interactive object configured as a selectable object near a window in which the video content is being displayed.

33. The apparatus of claim 29, wherein the at least one computer processor is further configured for displaying the interactive object configured as a selectable object overlying the video content.

34. A computer program product, comprising:
a non-transitory computer-readable medium comprising code for:
receiving video content sent from a computer server, the video content including a video ad break configured to initiate at a future point of the video content;
enabling, concurrently during play of the video content, display of multiple alternative video ads determined upon starting of the receiving of the video content and prior to the defined video ad break;
enabling, concurrently during play of the video content, user selection of at least one selected video ad from the multiple alternative video ads in response to a user input prior to the defined video ad break and upon starting of the receiving of the video content;
transmitting an identifier for the at least one selected video ad prior to initiation of the video ad break;
receiving the at least one selected video ad; and
playing the at least one selected video ad during the defined video ad break.

* * * * *